US010789440B2

(12) United States Patent
Duckett et al.

(10) Patent No.: US 10,789,440 B2
(45) Date of Patent: Sep. 29, 2020

(54) MECHANICAL HAND LABELER LOADING INSTRUCTIONS

(71) Applicant: AVERY DENNISON RETAIL INFORMATION SERVICES, LLC, Mentor, OH (US)

(72) Inventors: Jeanne Duckett, Franklin, OH (US); Tiffany Howe, New Lebanon, OH (US); David Liebrecht, Dayton, OH (US)

(73) Assignee: Avery Dennison Retail Information Services, LLC, Mentor, OH (US)

( * ) Notice: Subject to any disclaimer, the term of this patent is extended or adjusted under 35 U.S.C. 154(b) by 0 days.

(21) Appl. No.: 16/333,815

(22) PCT Filed: Sep. 15, 2017

(86) PCT No.: PCT/US2017/051838
§ 371 (c)(1),
(2) Date: Mar. 15, 2019

(87) PCT Pub. No.: WO2018/053303
PCT Pub. Date: Mar. 22, 2018

(65) Prior Publication Data
US 2019/0236324 A1 Aug. 1, 2019

Related U.S. Application Data

(60) Provisional application No. 62/395,716, filed on Sep. 16, 2016.

(51) Int. Cl.
*G06K 7/14* (2006.01)
*G06F 16/955* (2019.01)
(Continued)

(52) U.S. Cl.
CPC ........... *G06K 7/1417* (2013.01); *G06F 16/00* (2019.01); *G06F 16/9554* (2019.01); *G06K 17/00* (2013.01)

(58) Field of Classification Search
None
See application file for complete search history.

(56) References Cited

U.S. PATENT DOCUMENTS

| 6,280,565 B1 * | 8/2001 | Underwood | .......... B65C 11/004 156/574 |
| 9,990,605 B2 * | 6/2018 | Harcar | ................. G06Q 10/087 |

(Continued)

FOREIGN PATENT DOCUMENTS

| CN | 201769452 | 3/2011 |
| EP | 2977946 | 1/2016 |

OTHER PUBLICATIONS

International Search Report and Written Opinion of ISA/EPO Prepared for PCT/US2017/051838 dated Jan. 8, 2018.

*Primary Examiner* — Kristy A Haupt

(57) ABSTRACT

A process of providing user information for a mechanical hand labeler to instruct the user on proper use of the device and how to reorder consumables is disclosed. The mechanical hand labeler would comprise a Quick Response (QR) code that is embedded with Uniform Resource Locators (URLs) for different functions. The embedded URLs in the QR code are read via a smart phone. The smart phone reads the QR code and launches the appropriate website. Specifically, the QR code is placed on an outside of the mechanical hand labeler for providing instructions on loading supplies into the mechanical hand labeler; and the QR code is placed on an inside of the mechanical hand labeler for providing instructions on reordering supplies.

6 Claims, 5 Drawing Sheets

(51) Int. Cl.
*G06F 16/00* (2019.01)
*G06K 17/00* (2006.01)

(56) References Cited

U.S. PATENT DOCUMENTS

| | | |
|---|---|---|
| 2013/0071029 A1 | 3/2013 | Terwilliger et al. |
| 2013/0087608 A1 | 4/2013 | Addy et al. |
| 2013/0175335 A1* | 7/2013 | Roberts .............. G06Q 30/0241 |
| | | 235/375 |
| 2013/0277422 A1 | 10/2013 | Weinberg |

* cited by examiner

Buy NOW and Save
35% Off Your Favorite Genuine
Monarch Brand Labels

You have more options when you use Monarch brand labels
• Adhesives – general-purpose, removable or part-gum
• Security Slits – protect against price switching
• Bright White – optimum legibility
• Preprints – move promotional products faster
• Bold Fluorescents – pop off packaging, grabbing your customers' attention Prices are per thousand.
One ink roller included with each sleeve of labels.
Promotional offers are in effect for published quantities in the promotional offer.

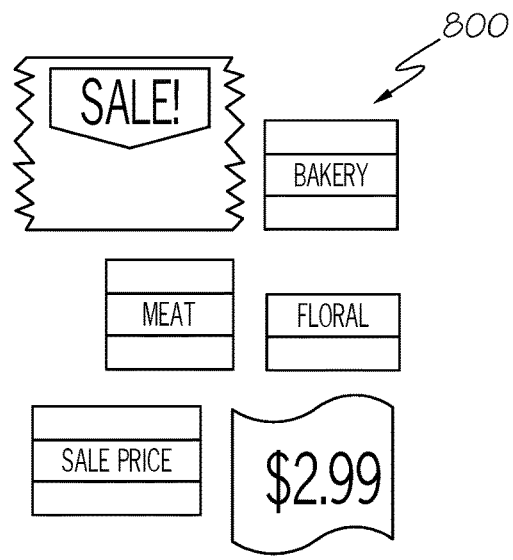

1110° Labels Order FEB-V24

| Quantity | Reg Price | Super Sale |
|---|---|---|
| 17M | $3.66 | $2.88 |
| 34M | 3.84 | 2.17 |
| 51M | 2.97 | 1.98 |
| 88M | 2.79 | 1.81 |
| 102M | 2.60 | 1.80 |
| 255M | 2.11 | 1.37 |

See page 7 for listing

1138° Labels Order FFP-V24

| Quantity | Reg Price | Super Sale |
|---|---|---|
| 14M | $5.70 | $3.71 |
| 28M | 5.15 | 3.35 |
| 58M | 4.77 | 3.10 |
| 84M | 4.40 | 2.86 |
| 112M | 3.35 | 2.18 |

See page 19 for listing

1130° Labels Order FO-V24

| Quantity | Reg Price | Super Sale |
|---|---|---|
| 25M | $3.48 | $2.28 |
| 50M | 3.15 | 2.67 |
| 75M | 2.65 | 1.72 |
| 150M | 2.48 | 1.61 |
| 200M | 2.01 | 1.31 |

See page 10 for listing

1115° Labels Order FM-V24

| Quantity | Reg Price | Super Sale |
|---|---|---|
| 15M | $5.70 | $3.71 |
| 30M | 5.15 | 3.35 |
| 45M | 4.77 | 3.10 |
| 60M | 4.30 | 3.10 |
| 80M | 3.21 | 2.85 |
| 120M | 3.08 | 2.54 |
| 240M | 3.05 | 2.18 |

See page 13 for listing    2.00

1151° AND 1152° Labels

| Quantity | Reg Price | Super Sale |
|---|---|---|
| 12M | $3.81 | $5.78 |
| 24M | 7.40 | 4.87 |
| 36M | 8.81 | 4.43 |
| 48M | 8.58 | 4.20 |
| 60M | 5.78 | 3.74 |
| 96M | 5.45 | 3.54 |

See page 21 for listing

1131° Labels Order FB-V24

| Quantity | Reg Price | Super Sale |
|---|---|---|
| 20M | $3.55 | $2.38 |
| 40M | 3.64 | 2.17 |
| 60M | 2.78 | 1.81 |
| 120M | 2.60 | 1.69 |
| 180M | 2.15 | 1.37 |

See page 10 for listing

1135° Labels Order FF-V24

| Quantity | Reg Price | Super Sale |
|---|---|---|
| 14M | $5.70 | $3.71 |
| 28M | 5.15 | 3.35 |
| 58M | 4.77 | 3.10 |
| 84M | 4.43 | 2.88 |
| 112M | 2.33 | 2.18 |

See page 10 for listing

1153° Labels Order FZ-V24

| Quantity | Reg Price | Super Sale |
|---|---|---|
| 12M | $3.81 | $5.78 |
| 24M | 7.40 | 4.87 |
| 38M | 8.81 | 4.43 |
| 48M | 8.58 | 4.20 |
| 60M | 5.78 | 3.74 |
| 96M | 5.45 | 3.54 |

See page 23 for listing

1153° Labels Order FD-V24

| Quantity | Reg Price | Super Sale |
|---|---|---|
| 17M | $5.42 | $3.52 |
| 34M | 4.33 | 3.17 |
| 51M | 4.53 | 2.94 |
| 88M | 4.18 | 2.72 |
| 102M | 3.71 | 2.41 |
| 138M | 3.25 | 2.88 |

See page 11 for listing

FIG. 8

MECHANICAL HAND LABELER LOADING INSTRUCTIONS

CROSS-REFERENCE TO RELATED APPLICATION(S)

The present application is a 371 of International Application No. PCT/US2017/051838, which was published in English on Sep. 16, 2017, and claims priority to and the benefit of U.S. Provisional Application No. 62/395,716 filed on Sep. 16, 2016, each of which is incorporated herein by reference in its entirety.

BACKGROUND

The present invention relates generally to improving a user's experience in learning to operate and maintain a mechanical hand labeler. More particularly, the present disclosure relates to a process for providing instructions to the user when various conditions, such as loading supplies, arise.

A mechanical hand labeler is without the benefit of a user display or CPU to enhance the operator experience so it is important to provide an easy method to locate information about the product when needed. Traditionally, the user (or operator) is provided with information about using the mechanical hand labeler via a printed manual, electronic manual, or a link to an informational website.

While these methods can be convenient forms of storing user information, when the user is using the product (i.e., mechanical hand labeler) in an operational setting the user is unlikely to have access to these forms of documentation.

Thus, there exists a need for an improved and convenient method of delivering user information regarding the mechanical hand labeler to a user in an operational setting. The present invention discloses a process of providing instructions to the user when various conditions, such as loading supplies, arise. The instructions would be provided via a barcode label on the mechanical hand labeler which would contain a hyperlink to the relevant information.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a process of providing user information for a mechanical hand labeler to instruct the user on proper use of the device and how to reorder consumables. The mechanical hand labeler would comprise a Quick Response (QR) code that is embedded with Uniform Resource Locators (URLs) for different functions. The embedded URLs in the QR code are read via a smart phone (or other device). The smart phone reads the QR code and launches the appropriate website.

In a preferred embodiment, a QR code is placed on an outside of the mechanical hand labeler for providing instructions on loading supplies into the mechanical hand labeler; and a QR code is placed on an inside of the mechanical hand labeler for providing instructions on reordering supplies.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 8 illustrates a perspective view of a supply reorder screen shot in accordance with the disclosed architecture.

DETAILED DESCRIPTION

Figure 1:
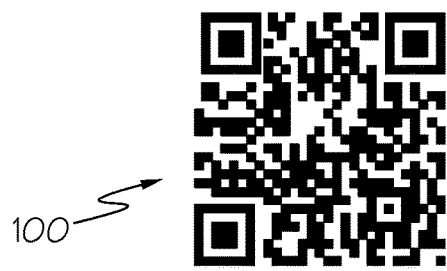
FIG. 1 illustrates a perspective view of an example QR barcode in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a process of providing user information for a mechanical hand labeler to instruct the user on proper use of the device and how to reorder consumables. The mechanical hand labeler would comprise a QR code that is embedded with URLs for different functions. The embedded URLs in the QR code are read via a smart phone. The smart phone reads the QR code and launches the appropriate website. Specifically, the QR code is placed on an outside of the mechanical hand labeler for providing instructions on loading supplies into the mechanical hand labeler; and the QR code is placed on an inside of the mechanical hand labeler for providing instructions on reordering supplies.

Figure 2:
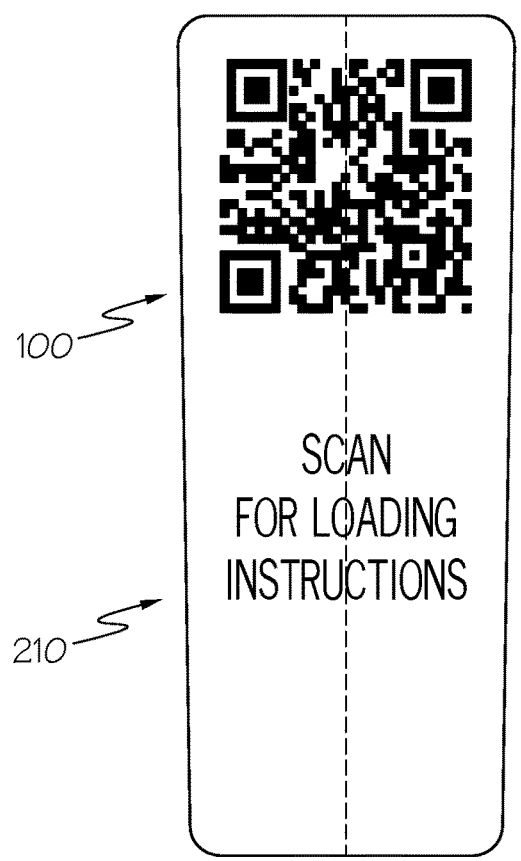
FIG. 2 illustrates a perspective view of a QR loading label in accordance with the disclosed architecture.
Figure 3:
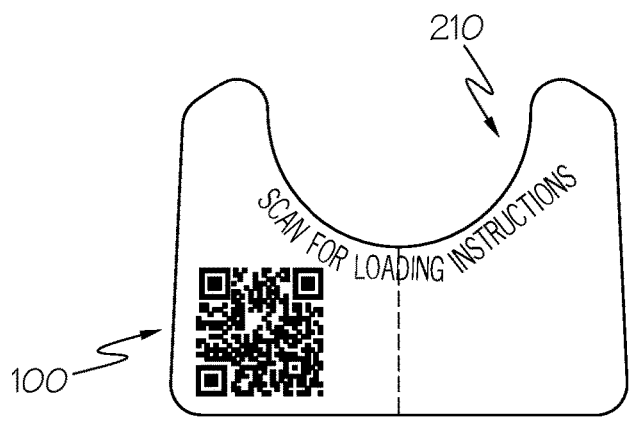
FIG. 3 illustrates a perspective view of a QR loading label in accordance with the disclosed architecture.
Figure 6:
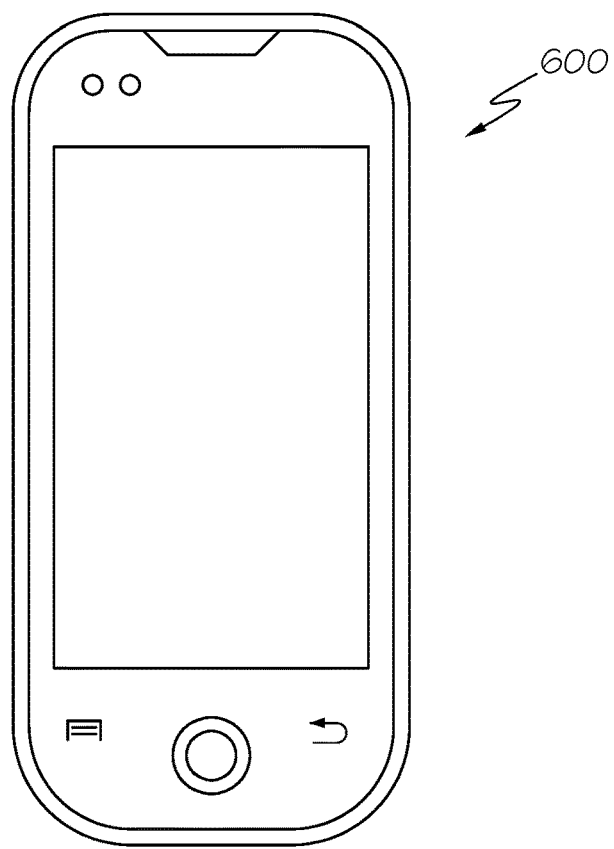
FIG. 6 illustrates a perspective view of an example smart device in accordance with the disclosed architecture.

Referring initially to the drawings, FIGS. 1-3 illustrate a Quick Response (QR) code 100 in accordance with the present invention. The QR code 100 is a type of matrix barcode, however any suitable machine-readable optical label can be used as is known in the art. The QR code 100 comprises embedded Uniform Resource Locators (URLs). The embedded URLs store information for different purposes, functions, and various conditions, such as loading supplies, etc. The embedded URLs in the QR code 100 are read (or accessed) with different smart phones 600 (or other smart devices) (as shown in FIG. 6). Thus, the smart phone 600 reads the QR code 100 with an embedded URL and launches the appropriate website.

Figure 4:
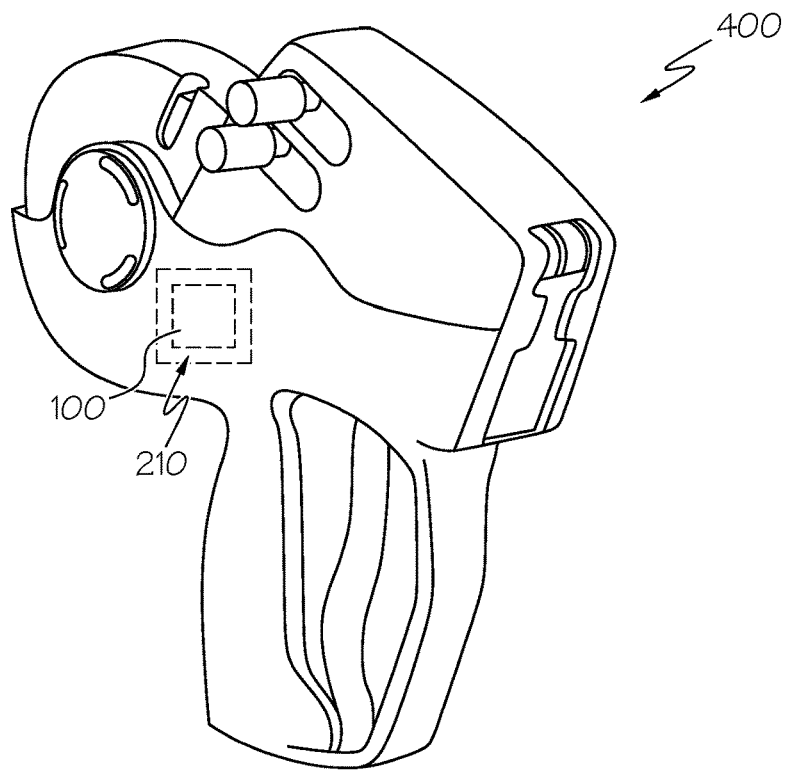
FIG. 4 illustrates a perspective view of a mechanical hand labeler with a QR code on the outside supply cover in accordance with the disclosed architecture.
Figure 5:
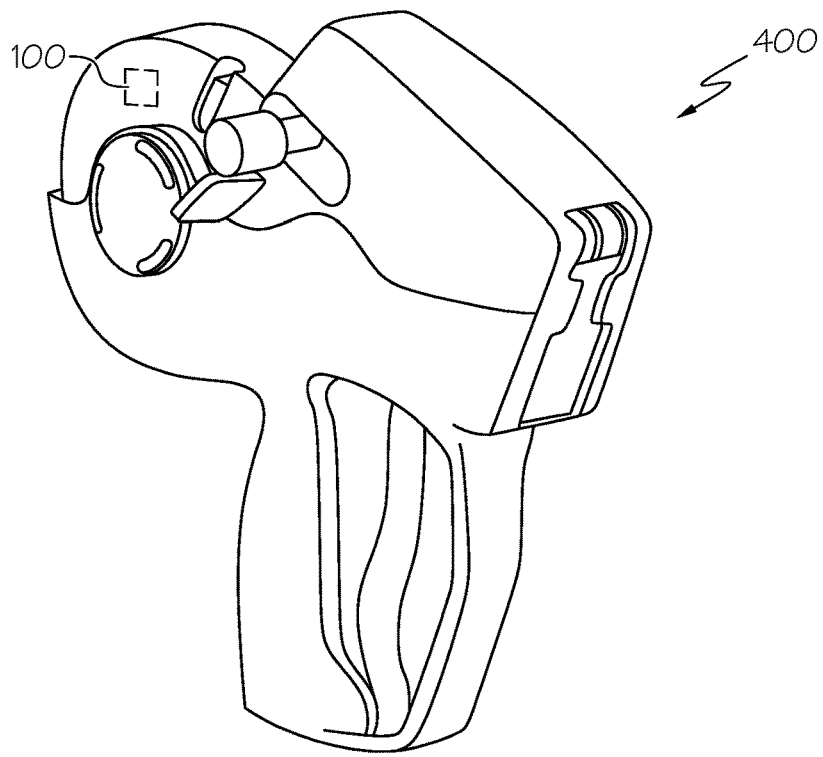
FIG. 5 illustrates a perspective view of a mechanical hand labeler with a QR code on the inside cover in accordance with the disclosed architecture.

As shown in FIGS. 4-5, the mechanical hand labelers 400 do not need electric or battery power to operate. The mechanical hand labelers 400 can be any suitable hand labelers or other labeling devices as is known in the art. The mechanical hand labelers 400 will be clearly marked with a label 210 (or other means) containing the QR code 100 as shown in FIG. 2 or as shown in FIG. 3. The mechanical hand labelers 400 can be marked with the QR code 100 either on the outside of the labeler (as shown in FIG. 4) or on the inside of the labeler (as shown in FIG. 5). Specifically, the QR code 100 can be positioned at any suitable position on the inside and/or the outside of the mechanical hand labelers 400 depending on the wants and/or needs of the user, and/or manufacturing constraints.

Typically, the QR code 100 is positioned on the outside of the mechanical hand labeler 400 when the QR code 100 provides instructions on how to load supplies into the mechanical hand labelers 400. And, the QR code 100 is typically positioned on the inside of the mechanical hand labeler 400 when the QR code 100 provides instructions on how to reorder supplies when the mechanical labeler 400 is empty.

Figure 9:
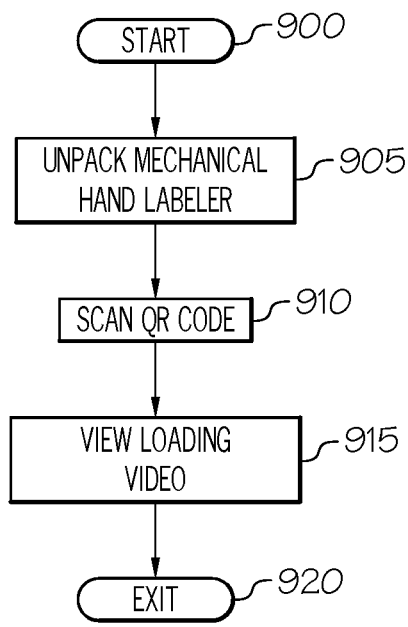
FIG. 9 illustrates a flowchart for the process of accessing the supply loading video in accordance with the disclosed architecture.

Generally referring to FIG. 9, the disclosed mechanical hand labeler, or any other suitable hand labeler comprises at least one customizable QR code on the outside of the labeler, on the supply cover. This QR code enables a user to scan the QR code to receive instructions on how to load supplies into the labeler.

Figure 7:
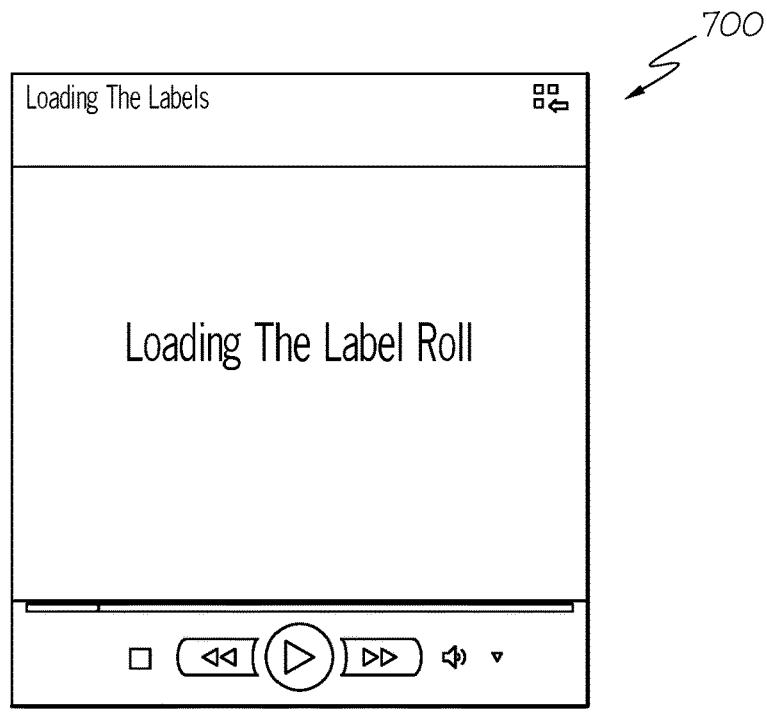
FIG. 7 illustrates a perspective view of a loading video screen shot in accordance with the disclosed architecture.

For example as shown in FIG. 9, the process begins at 900. At 905, a user unpacks the mechanical hand labeler from the shipping container. The mechanical hand labeler will be clearly marked with a QR code as shown in FIG. 2 or 3. At 910, the user will utilize a smart phone (or other smart device) to scan the QR code on the labeler, which will launch the supply loading video. A representative screen shot 700 from the video is shown in FIG. 7. At 915, the user views the supply loading video and receives instruction on how to load supplies into the hand labeler. The process then exits at 920.

Figure 10:
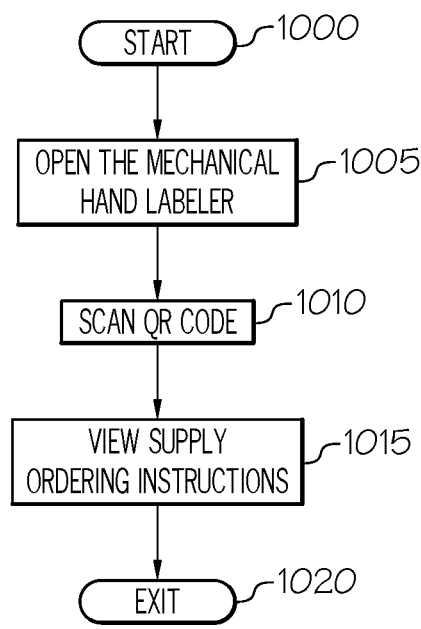
FIG. 10 illustrates a flowchart for the process of accessing reorder of supplies instructions in accordance with the disclosed architecture.

Generally referring to FIG. 10, the disclosed mechanical hand labeler, or any other suitable hand labeler comprises at least one customizable QR code on the inside of the labeler, on the inside of the supply cover. This QR code enables a user to scan the QR code to receive instructions on how to reorder supplies for that specific labeler.

For example as shown in FIG. 10, the process begins at 1000. At 1005, the user opens the mechanical hand labeler when the user notices that the supplies for the labeler have run out. At 1010, the user sees the QR code on the inside of the supply cover (as shown in FIG. 5) and scans the QR code, which will launch the supplies reorder webpage for that specific hand labeler. At 1015, the user views the supplies reorder page which supplies the user with the information needed to reorder supplies for that specific hand labeler. A representative screen shot 800 from the supplies reordering page is shown in FIG. 8. The process then exits at 1020.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A process for providing a user with instructions for operating a mechanical hand labeler, comprising the steps of:
   positioning QR codes on a mechanical hand labeler;
   scanning the QR codes;
   wherein one of the QR code is positioned on an outside of a supply cover of the hand labeler; and once the QR code positioned on the outside of the supply cover is scanned, a website on supply loading the hand labeler is launched; and
   wherein another one of the QR code is positioned on an inside of a supply cover of the hand labeler; and once the QR code positioned on the inside of the supply cover is scanned, a website on supply ordering for the hand labeler is launched and viewing instructions on operating the mechanical hand labeler on a website on supply ordering; and
   viewing instructions on operating the mechanical hand labeler on the website on supply loading and on the website on supply ordering.

2. The process of claim 1, wherein the QR code is scanned via a smart phone.

3. The process of claim 1, wherein the QR code comprises embedded Uniform Resource Locators (URLs).

4. The process of claim 3, wherein the URLs are tied to different functions and instructions.

5. The process of claim 1, further comprising the steps of receiving instruction on how to load supplies into the hand labeler; and performing function of loading supplies in the hand labeler.

6. The process of claim 1, wherein the hand labeler does not need electric or battery power to operate.

\* \* \* \* \*